United States Patent
Dadu et al.

(10) Patent No.: US 9,413,434 B2
(45) Date of Patent: Aug. 9, 2016

(54) CANCELLATION OF INTERFERING AUDIO ON A MOBILE DEVICE

(71) Applicant: Intel Corporation, Santa Clara, CA (US)

(72) Inventors: Saurabh Dadu, Tigard, OR (US); Saurin Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 14/126,873

(22) PCT Filed: Oct. 4, 2013

(86) PCT No.: PCT/US2013/063389
§ 371 (c)(1),
(2) Date: Dec. 17, 2013

(87) PCT Pub. No.: WO2015/050556
PCT Pub. Date: Apr. 9, 2015

(65) Prior Publication Data
US 2015/0098578 A1 Apr. 9, 2015

(51) Int. Cl.
*H04B 3/20* (2006.01)
*H04B 7/015* (2006.01)
*H04M 9/08* (2006.01)
*G10K 11/175* (2006.01)

(52) U.S. Cl.
CPC ............. *H04B 7/015* (2013.01); *H04M 9/082* (2013.01); *G10K 11/175* (2013.01)

(58) Field of Classification Search
None
See application file for complete search history.

(56) References Cited

U.S. PATENT DOCUMENTS

| 8,041,026 | B1 | 10/2011 | Coughlan et al. |
| 2007/0150261 | A1 | 6/2007 | Ozawa |
| 2009/0252343 | A1 | 10/2009 | Mao |
| 2012/0004909 | A1 | 1/2012 | Beltman et al. |
| 2013/0083934 | A1* | 4/2013 | Ahgren ............ 381/58 |
| 2013/0083943 | A1* | 4/2013 | Sorensen et al. ........ 381/92 |

FOREIGN PATENT DOCUMENTS

JP 2006227634 A 8/2006

OTHER PUBLICATIONS

International Search Report and Written Opinion received for PCT Application No. PCT/US2013/063389, mailed on Jun. 26, 2014, 14 pages.

(Continued)

*Primary Examiner* — Andrew L Sniezek
(74) *Attorney, Agent, or Firm* — Grossman, Tucker, Perreault & Pfleger, PLLC

(57) ABSTRACT

Generally, this disclosure provides devices, systems and methods for cancelling an interfering audio signal. The system may include a mobile device including a microphone configured to capture an acoustic audio signal, the acoustic audio signal a combination of the interfering audio signal and a desired audio signal, the desired audio signal generated by a user of the mobile device. The system may also include a wireless communication module incorporated in the mobile device, to receive a reference signal through a side-channel, the reference signal associated with the interfering audio signal. The system may further include an acoustic echo cancellation module incorporated in the mobile device, the acoustic echo cancellation module to cancel the interfering audio signal from the captured acoustic audio signal, the cancellation based on the reference signal.

23 Claims, 5 Drawing Sheets

(56) References Cited

OTHER PUBLICATIONS

International Preliminary Report on Patentability received for PCT Application No. PCT/US2013/063389, mailed Apr. 14, 2016, 11 pages.

International Preliminary Report on Patentability received for PCT Application No. PCT/US2013/063389, mailed Apr. 14, 2016, 6 pages.

* cited by examiner

400

Capture an acoustic audio signal on a mobile device, the acoustic audio signal includes a combination of an interfering audio signal and a desired audio signal, the desired audio signal generated by a user of the mobile device

410

Receive a reference signal through a side-channel to the mobile device, the reference signal associated with the interfering audio signal

420

Cancel the interfering audio signal from the captured acoustic audio signal based on the reference signal

CANCELLATION OF INTERFERING AUDIO ON A MOBILE DEVICE

FIELD

The present disclosure relates to acoustic echo cancellation and, more particularly, to acoustic echo cancellation of an interfering audio signal received at a mobile communications device based on a reference signal transmitted to the mobile device over a wireless side-channel.

BACKGROUND

Speech recognition systems and other natural language processing systems are being developed to enable increasing use of speech based interaction with mobile communication devices such as, for example, smartphones and vehicle phones. The environment in which these types of phones are used presents challenges to the speech recognition systems due to audio interference including wind noise, road noise and car radio, audio player or other in-vehicle entertainment systems. The phone's microphone typically picks up these interfering audio sources, along with the user's speech, thereby decreasing the reliability of the speech recognition system or other applications that may be employed to process or act on the user's speech. Additionally, the interfering audio generally makes it more difficult for the person at the other end of the phone call to understand the user's speech and follow the conversation.

Some systems attempt to cancel out the interference using processing techniques that require a-priori information, for example, probability and statistical information about the interfering signal. This may be possible to some extent for cancelling wind or road noise, which can be modeled as white noise with assumed statistical properties. Interfering audio signals, however, which may also include speech, are generally not amenable to these cancellation techniques.

Other systems attempt to address the interference problem by muting the vehicles speakers while the phone is in use, but this adversely impacts other passengers in the car by depriving them of the audio or entertainment that would otherwise be available.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 4 illustrates a flowchart of operations of one example embodiment consistent with the present disclosure.

Although the following Detailed Description will proceed reference being made to illustrative embodiments, many alternatives, modifications, and variations thereof will be apparent to those skilled in the art.

DETAILED DESCRIPTION

Generally, this disclosure provides devices, systems and methods for acoustic echo cancellation of an interfering audio signal received at a mobile communications device or car phone. The cancellation may be based on a reference signal transmitted to the phone over a wireless side-channel which may be employed between the phone and the system that generates the interfering audio, such as, for example, a vehicle sound system, radio, media player or television. The side-channel may be, for example, a Wi-Fi, Bluetooth or other short range wireless communication link. The reference signal may include a replica of the interfering audio signal which may, in some embodiments, be a scaled, time shifted or otherwise encoded version that substantially represents the characteristics of the interfering signal to an extent that enables the cancellation of that signal.

Cancellation of the interfering signal max improve the transmission of the desired signal, for example the user's voice or speech, to the far end of the call or to an on-device speech recognition system or application that utilizes the user's voice.

Figure 1:
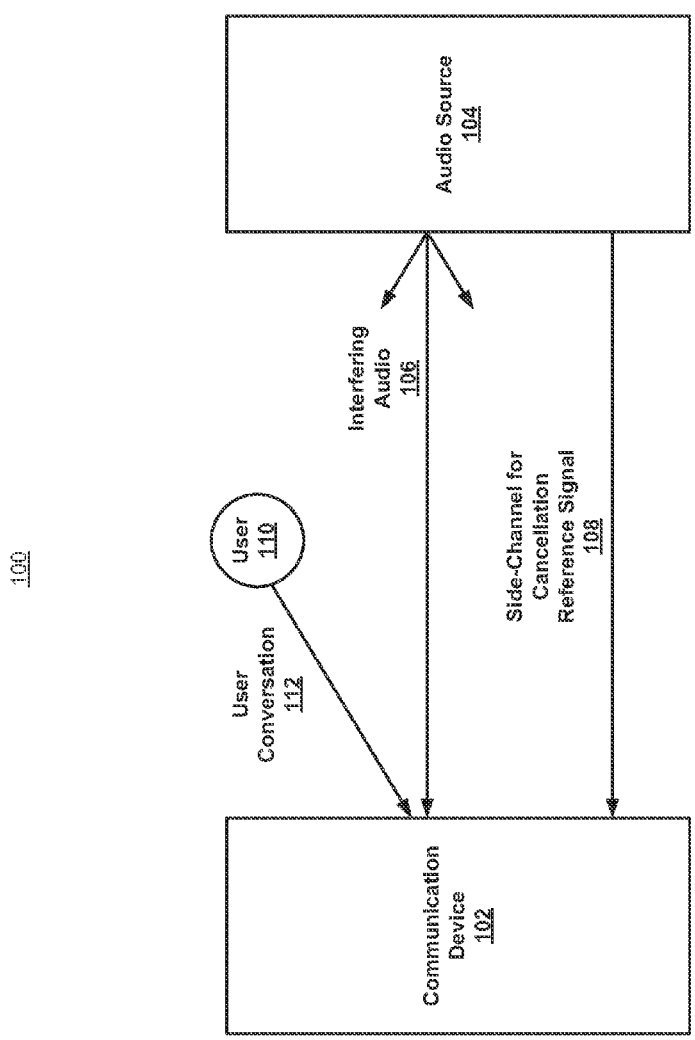
FIG. 1 illustrates a top level system diagram of one example embodiment consistent with the present disclosure.

FIG. 1 illustrates a top level system diagram 100 of one example embodiment consistent with the present disclosure. In particular, FIG. 1 shows a communication device 102 within proximity of an audio source 104 and a user 110. In some embodiments, the geographic proximity or location of these elements (102, 104 and 110) may be within a vehicle or within an area or region of a home or office or other suitable space. The communication device 102 may be any type of mobile phone, smartphone, tablet, notebook, personal digital assistant (PDA), car phone or other suitable communication device. The audio source 104 may be a television, stereo, radio, media player, in-vehicle infotainment (IVI) system or other type of audio source. Media players may include a DVD player, an MP3 player, a CD player, a navigation system, a Blu-Ray disc player, a home entertainment system, a portable media player, iPod®, iTouch®, or any other device capable of playing multimedia files. Audio from the audio source 104 may be played through speakers and picked up as interfering audio 106 by the communication device 102 along with the user's speech or conversation 112. A side-channel 108 is provided to convey an audio cancellation reference signal from the audio source 104 to the communication device 102. The side channel 108 may be a Wi-Fi, Bluetooth or other short range communication link suitable to cover the geographic proximity illustrated in FIG. 1. The communication device 102 may be configured to perform acoustic echo cancellation (AEC) to remove or reduce the interfering audio signal 106 relative to the user conversation audio 112, using the reference signal as will be described in greater detail below.

Figure 2:
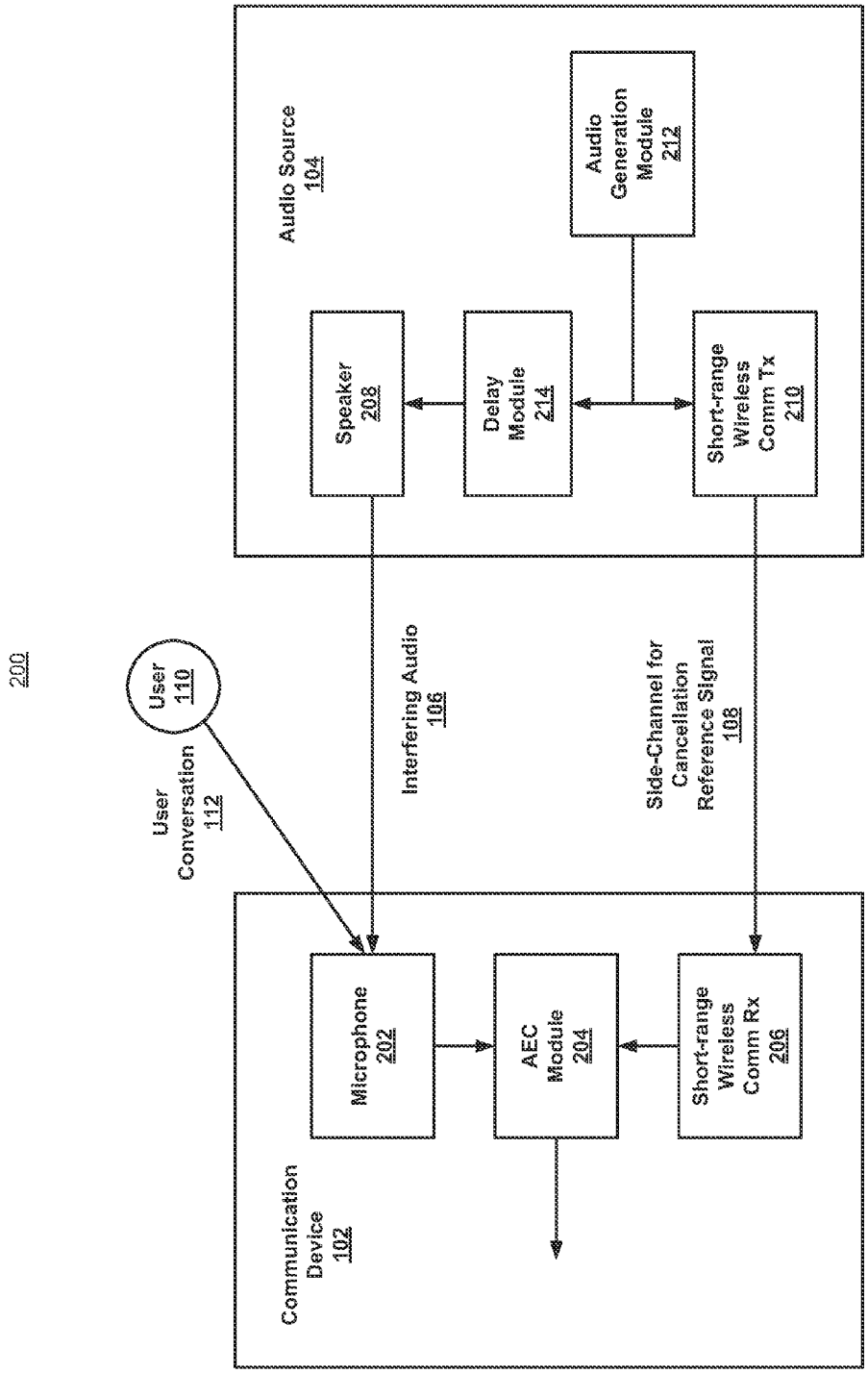
FIG. 2 illustrates a block diagram of one example embodiment consistent with the present disclosure.

FIG. 2 illustrates a block diagram 200 of one example embodiment consistent with the present disclosure. Audio source 104 is shown to include an audio generation module 212, a speaker 208, an adjustable delay module 214, and a short-range wireless communication transmitter 210. Audio generation module 212 may be configured to generate audio, for example as part of a television program or media player presentation, or as part of an AM, FM or satellite radio program. The generated audio, from module 212, may be delivered to one or more speakers 208 which are configured to broadcast the audio as an acoustic signal through the environment or geographic proximity of audio source 104. While this acoustic signal may represent a signal of interest to some listeners in the proximity of the audio source 104, it also serves as an interfering audio signal to a user 110 of the communication device 102.

In some embodiments, the delay module 214 may be configured to delay the arrival of the audio signal at the speaker 208 to ensure that the interfering audio 106 does not reach the communication device 102 before the reference signal 108, which might otherwise occur due to circuit or processing delays in the reference signal 108 path. If the reference signal 108 were to arrive after the interfering audio 106, its usefulness for cancellation would be limited. The delay provided by delay module 214 may be fixed or adjustable. If delay is fixed, it may be a pre-determined, calibrated or otherwise known value. If the delay is adjustable, it may be set by a processor or other suitable control circuit or module (not shown). Generally, the delay is set to a value of sufficient length to compensate for processing delays but short enough to be unnoticed by the user 110.

The generated audio, from module 212, may therefore also be delivered to short-range wireless communication transmitter 210, which is configured to perform wireless transmission of this interfering audio signal, or transmission of some version or representation thereof, which is suitable for use as a reference signal for echo cancellation to be performed by the communication device 102. The wireless transmission may be performed over side channel 108 may be, for example, a Wi-Fi, Bluetooth or other short range communication link.

Communication device 102 is shown to include a microphone 202, an AEC module 204 and a short-range wireless communication receiver 206. Microphone 202 is configured to receive the voice or speech of user 110 who may be engaged in user conversation 112. Microphone 202 may also, however, receive the interfering audio signal 106 that is broadcast by audio source 104 and therefore generates a combination signal that includes both the desired audio signal in 112 and the interfering audio signal 106.

Short-range wireless communication receiver 206 may be configured to receive the cancellation reference signal over side-channel 108 and provide the reference signal to AEC module 204. Module 206 may be configured to receive the reference signal over a Wi-Fi, Bluetooth or other short range communication link.

AEC module 204 may be configured to cancel (e.g., reduce or remove) the interfering signal from the combination signal using any suitable cancellation or echo cancellation technique. For example, in some embodiments, AEC module 204 may transform the reference signal into an anti-phase or inverted version of the interfering signal. This may involve time shifting, scaling or other signal processing operations. The anti-phase signal may then be added to the combination signal to cancel out the interfering signal. The superposition of the anti-phase signal with the combination signal may substantially cancel the interfering signal since both the reference signal and the interfering signal originate from the same source and comprise substantially similar properties and characteristics such as amplitude frequency and phase as a function of time. Additional cancellation techniques may also be utilized, such as for example, active noise control, noise cancellation, active noise reduction or automatic gain control.

Figure 3:
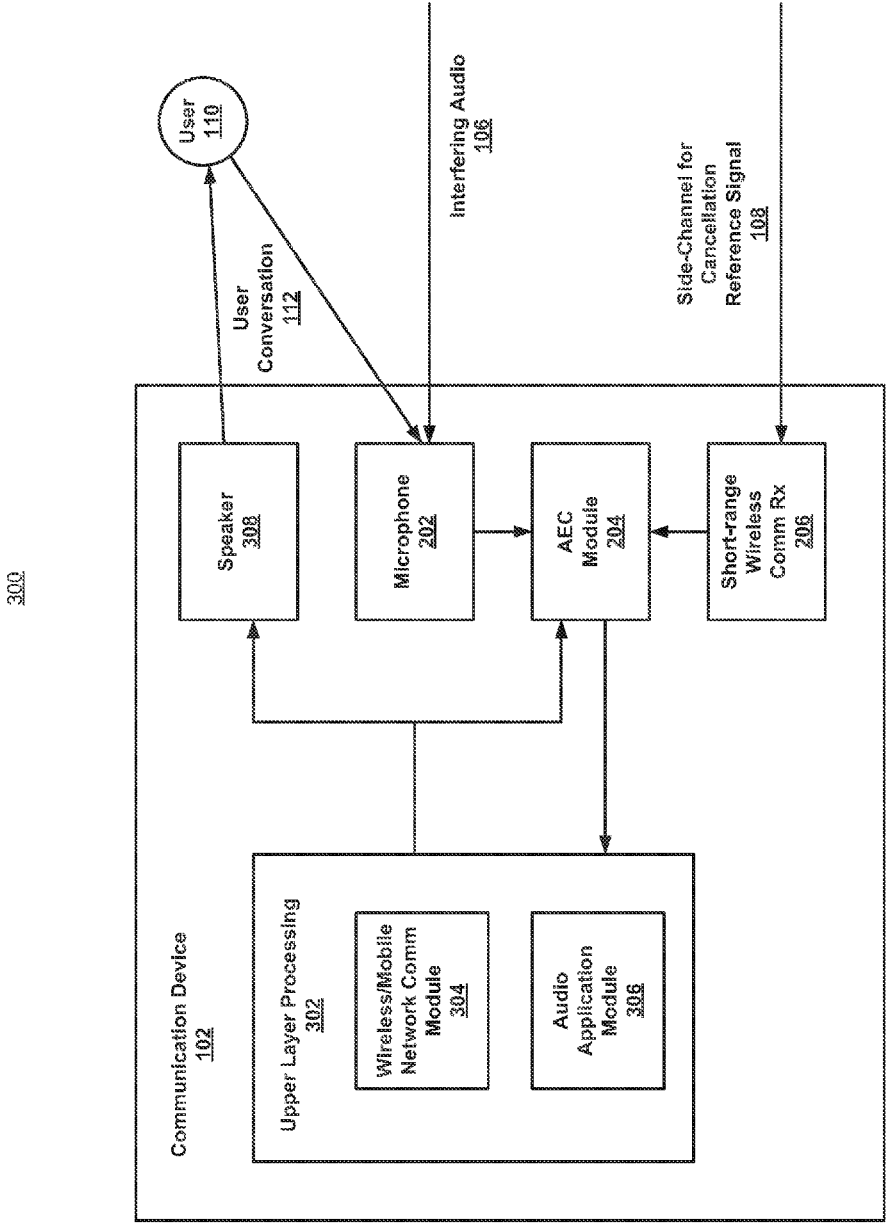
FIG. 3 illustrates a block diagram of another example embodiment consistent with the present disclosure.

FIG. 3 illustrates a block diagram 300 of another example embodiment consistent with the present disclosure. Communication device 102 is shown to further include speaker 308 in addition to microphone 202. Speaker 308 provides audio output to user 110 and microphone 202 provides audio input from the user in combination with surrounding ambient sounds and noise. In one embodiment, the communication device 102 includes a mouthpiece microphone located generally at one end of the phone and an earpiece speaker located generally at the other end of the phone. The mouthpiece microphone and earpiece speaker are configured for use when the device 102 is placed near the user's head so that the mouth piece microphone is located adjacent to the user's mouth and the earpiece speaker is adjacent to the user's ear. The device 102 may also include a separate microphone configured to gather remote sounds when the device is placed in speaker mode or the same microphone may be used for both modes of operation. The device 102 may also include a conference speaker configured to be heard by any person within range, for example several feet of the device, while the earpiece speaker is configured to be heard by a single individual whose ear is near the earpiece speaker.

The microphone 202 may be configured to receive ambient sounds, including but not limited to the interference audio signal, as sound waves emitted from surrounding speakers, the mobile device user's voice, or any surrounding sounds. The communication device 102 may be equipped with a microphone 202 to receive ambient sounds from the surrounding environment and audio waves from an audio source 104 playing audio through the speakers 208. The device 102 can detect the audio being played from the speakers 20 through the microphone 202 as an interfering audio signal. Ambient sounds may include for example, the user's voice, background noise, miscellaneous speech or voices, traffic, wind and road noise, etc.

Communication device 102 is shown to further include upper layer processing module 302 which may include wireless mobile network communication module 304 and/or audio application module 306. Wireless mobile network communication module 304 may be configured provide modulation/demodulation operations (e.g., serve as a modem) on the audio signals of user conversation 112. The modem may therefore link communication device 102 to a wireless/mobile phone network, such as for example a Long Term Evolution (LTE or LTE-A) phone network, or other 3G or 4G cellular radio/phone networks or a Wireless Wide Area Network (WWAN) or voice over internet protocol (VOIP). User conversation 112 may therefore extend from user 110 to a second, or far end, user on the wireless/mobile network.

Audio application module 306 maybe a speech recognition module or other suitable voice activated or voice responsive system. Both wireless/mobile network communication module 304 and audio application module 306 may therefore benefit from the improvement provided by AEC module 204 to the user conversation or speech signal 112.

The short-range wireless communication modules 206 and 210 may be configured to exchange data over short distances from fixed and mobile devices. In some embodiments, the wireless communication module 206 and 210 may employ any of various wireless protocols including the IEEE 802.15.x or the IEEE 802.11x protocols for wireless personal networks (WPANs), among other wireless protocols. Modules 206 and 210 may execute short range data exchange wirelessly using Bluetooth® wireless technology standard, Wi-Fi wireless technology, ANT™ wireless network technology, or any other wireless technology either existing or future developed. In some embodiments, the wireless communication modules 206 and 210 may include one or a combination of: an infrared (IR) connection, such as an Infrared Data Association (IrDA) connection; at radio frequency (RF) connection, such as a Bluetooth® or IEEE 802.15.1 connection, Ultra Wideband (UWB) or IEEE 802.15.3a connection, or Zigbee or IEEE 802.15.4 connection; among other communication interfaces.

It will be appreciated that the communication device 102 shown in FIG. 3 and described herein is only one example of a mobile communication device, and that the device may have additional, fewer or different components or a different arrangement or configuration of components, without departing from the scope of the disclosure. For example, other suitable input or output devices may be used along with various applications.

Thus, for example, the speakers of an automobile sound system (or video entertainment system) may generate acoustic sound for the benefit of one or more occupants of the vehicle. The acoustic sound may be picked up, however, as undesirable interference by a microphone of a mobile phone device being used by another of the occupants of the vehicle. The automobile sound system may wirelessly transmit a reference signal over a side channel that is received by the mobile phone device, and used by an acoustic echo cancellation module of the mobile phone device to remove or reduce the interfering signal. The resulting call quality may therefore be unproved and the reliability of speech recognition or other voice applications may be increased.

As another example, the speakers of a television (or other type of home entertainment system) may generate acoustic sound for the benefit of one or more viewers in the room of a house. The acoustic sound may be picked up, however, as undesirable interference by a microphone of a phone device being used by another person in the house. The television may wirelessly transmit a reference signal over a side channel that is received by the phone device, and used by an acoustic echo cancellation module of the phone device to remove or reduce the interfering signal. The resulting call quality may therefore be improved and the reliability of speech recognition or other voice applications may be increased.

FIG. 4 illustrates a flowchart of operations 400 of one example embodiment for cancelling an interfering audio signal consistent with the present disclosure. At operation 410, an acoustic audio signal is captured on a mobile device, for example, through a microphone of the device. The acoustic audio signal includes a combination of the interfering audio signal and a desired audio signal. The desired audio signal is generated by a user of the mobile device. At operation 420, a reference signal is received through a side-channel to the mobile device. The reference signal is associated with the interfering audio signal ad may be a replica of the interfering signal. At operation 430, the interfering audio signal is cancelled from the captured acoustic audio signal. The cancellation is based on the reference signal.

Figure 5:
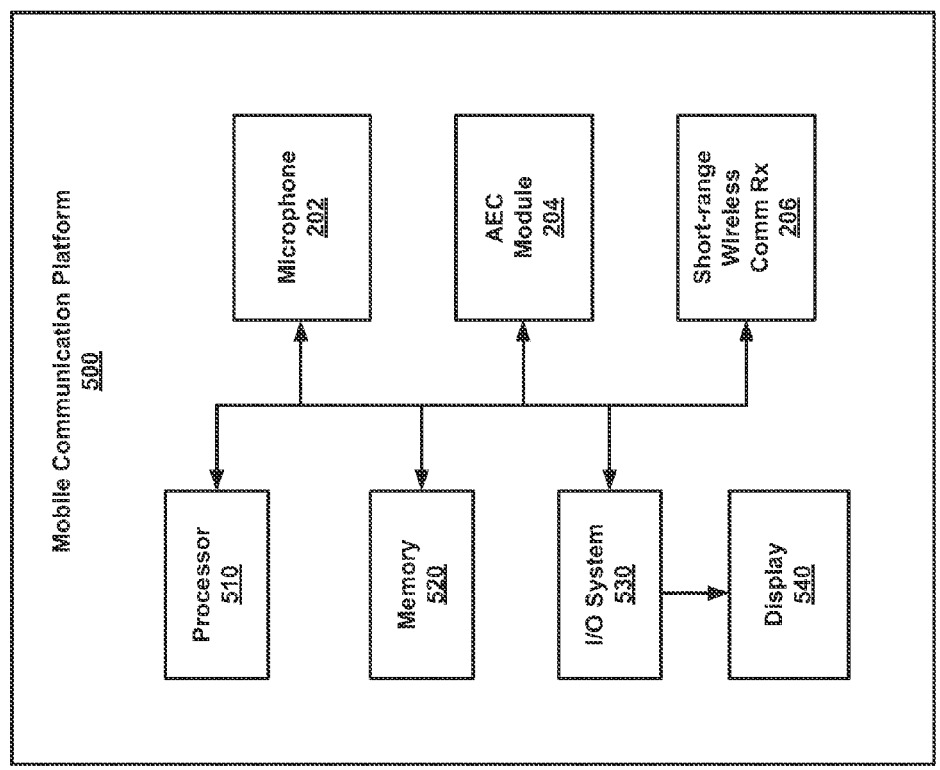
FIG. 5 illustrates at platform of one example embodiment consistent with the present disclosure.

FIG. 5 illustrates a system diagram of a mobile communication platform 500 of one example embodiment consistent with the present disclosure. Platform 500 may be a computing or communication device, such as, for example, a laptop computer, tablet, notebook, phone, smartphone, Ultrabook or any other communication and/or computing device. Platform 500 may include a processor 510, memory 520, an input/output (I/O) system 530, microphone 202, and a display 540. The display 540 may be a touchscreen display. The I/O system 530 may include a keyboard, speaker, or any other suitable I/O device. The keyboard or keypad (not shown) may include multiple keys used in operation of the device. The keypad may be included in the touch screen, which may be integrated with the display. The keypad may include numeric keys, alphabetic keys, standard telephone keys, or any other icons or symbols. The display of the keypad or individual keys, may also change based on the application currently operating on the device. The platform 500 may include any number of other user interfaces such as one or more manual buttons, a mouse, or other interface. The user can select and activate device options by touching a screen or pressing buttons, for example.

Platform 500 may also include a wireless communication receiver 206, configured to receive a cancellation reference signal, as described previously. The platform 500 may also include one or more an antenna (not shown), which may be internal or external to the device, for wireless communications, both short-range and long-range. Platform 500 may further include an acoustic echo cancellation module 204, configured to cancel the interfering audio signal using the reference signal, as described previously.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination as would be understood by one skilled in the art. Thus, not all of the operations of each of the flowcharts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk re-writables (CD-RWs), digital versatile disks (DVDs) and magneto-optical disks, semiconductor devices such as read-only memories (ROMs), random access memories (RAMs) such as dynamic and static RAMs, erasable programmable lead-only memories (EPROMs), electrically erasable programmable read-only memories (EEPROMs), flash memories, magnetic or optical cards, or any type of media suitable for storing electronic instructions.

"Circuitry," as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides devices, systems, methods, computer readable media and platforms for acoustic echo cancellation of an interfering audio signal received at a mobile communications device or car phone. The following examples pertain to further embodiments.

The system may include a mobile device including a microphone to capture an acoustic audio signal, the acoustic audio signal including a combination of the interfering audio signal and a desired audio signal, the desired audio signal generated by a user of the mobile device. The system of this example may also include a wireless communication module incorporated in the mobile device, to receive a reference signal through a side-channel, the reference signal associated with the interfering audio signal. The system of this example may further include an acoustic echo cancellation module incorporated in the mobile device, the acoustic echo cancellation module to cancel the interfering audio signal from the captured acoustic audio signal, the cancellation based on the reference signal.

Another example system includes the forgoing components and the reference signal includes a replica of the interfering audio signal.

Another example device includes the forgoing components and the wireless communication module is to provide short-range communications to receive the reference signal.

Another example device includes the forgoing components and the short-range communications are Bluetooth or Wi-Fi communications.

Another example device includes the forgoing components and the interfering audio signal and the reference signal are generated by a vehicle sound system, an entertainment system or a media playing device.

Another example device includes the forgoing components and the mobile device is a smart phone, a smart tablet or a personal digital assistant.

According to another aspect there is provided a method. The method may include capturing an acoustic audio signal on a mobile device, and the acoustic audio signal includes a combination of the interfering audio signal and a desired audio signal, the desired audio signal generated by a user of the mobile device. The method of this example may also include receiving a reference signal through a side-channel to the mobile device, the reference signal associated with the interfering audio signal. The method of this example may further include cancelling the interfering audio signal from the captured acoustic audio signal, the cancellation based on the reference signal.

Another example method includes the forgoing operations and the reference signal includes a replica of the interfering audio signal.

Another example method includes the forgoing operations and further includes receiving the reference signal through short-range wireless communication.

Another example method includes the forgoing operations and the short-range wireless communications are Bluetooth or Wi-Fi communications.

Another example method includes the forgoing operations and the interfering audio signal and the reference signal are generated by a vehicle sound system, an entertainment system or a media playing device.

Another example method includes the forgoing operations and the mobile device is a smart phone, a smut tablet or a personal digital assistant.

According to another aspect there is provided a mobile communications platform. The platform may include a processor, an input/output module coupled to the processor and a memory coupled to the processor. The platform of this example may also include a microphone coupled to the input/output module, the microphone to capture an acoustic audio signal, the acoustic audio signal including a combination of the interfering audio signal and a desired audio signal, the desired audio signal generated by a user of the platform. The platform of this example may further include a wireless communication module to receive a reference signal through a side-channel, the reference signal associated with the interfering audio signal. The platform of this example may further include an acoustic echo cancellation module to cancel the interfering audio signal from the captured acoustic audio signal, the cancellation based on the reference signal.

Another example platform includes the forgoing components and the reference signal includes a replica of the interfering audio signal.

Another example platform includes the forgoing components and the wireless communication module is to provide short-range communications to receive the reference signal.

Another example platform includes the forgoing components and the short-range communications are Bluetooth or Wi-Fi communications.

Another example platform includes the forgoing components and the mobile device is a smart phone, a smart tablet or a personal digital assistant.

Another example platform includes the forgoing components and further includes a touch screen display coupled to the input/output module.

According to another aspect there is provided an audio source device the device may include an audio generation module to generate an interfering audio signal. The device of this example may also include a speaker to acoustically transmit the interfering audio signal, the interfering audio signal received by a mobile communication device. The system of this example may further include a wireless communication module to transmit a reference signal through a side-channel to the mobile communication device, the reference signal associated with the interfering audio signal for acoustic echo cancelation by the mobile communication device.

Another example device includes the forgoing components and further includes a delay module to delay the transmission of the interfering signal from the audio generation module to the speaker.

Another example device includes the forgoing components and the reference signal includes a replica of the interfering audio signal.

Another example device includes the forgoing components and the wireless communication module is to provide short-range communications to transmit the reference signal.

Another example device includes the forgoing components and the short-range communications are Bluetooth or Wi-Fi communications.

Another example device includes the forgoing components and the device is a vehicle sound system, an entertainment system or a media playing device.

According to another aspect there is provided a system. The system may include a means for capturing an acoustic audio signal on a mobile device, and the acoustic audio signal includes a combination of the interfering audio signal and a desired audio signal, the desired audio signal generated by a user of the mobile device. The system of this example may also include a means for receiving a reference signal through a side-channel to the mobile device, the reference signal associated with the interfering audio signal. The system of this example may further include a means for cancelling the interfering audio signal from the captured acoustic audio signal, the cancellation based on the reference signal.

Another example system includes the forgoing components the reference signal includes a replica of the interfering audio signal.

Another example system includes the forgoing components and further includes as means for receiving the reference signal through short-range wireless communication.

Another example system includes the forgoing components and the short-range wireless communication are Bluetooth or communications.

Another example system includes the forgoing components and the interfering audio signal and the reference signal are generated by a vehicle sound system, an entertainment system or a media playing device.

Another example system includes the forgoing components and the mobile device is a smart phone, a smart tablet or a personal digital assistant.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the exam examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for cancelling an interfering audio signal, said system comprising:
    a mobile device comprising a microphone to capture an acoustic audio signal, said acoustic audio signal comprising a combination of a delayed version of said interfering audio signal and a desired audio signal, said desired audio signal generated by a user of said mobile device;
    wireless communication circuitry incorporated in said mobile device to receive a wireless communication signal, including a reference signal generated based on said interfering audio signal, through a side-channel comprising a wireless communication link between a source of said interfering signal and said mobile device; and
    acoustic echo cancellation circuitry incorporated in said mobile device, said acoustic echo cancellation circuitry to cancel said delayed version of said interfering audio signal from said captured acoustic audio signal, said cancellation based on said reference signal.

2. The system of claim 1, wherein said reference signal comprises a replica of said interfering audio signal.

3. The system of claim 1, wherein said wireless communication circuitry is to provide a short-range wireless communication link to receive said reference signal.

4. The system of claim 3, wherein said short-range wireless communication link is a Bluetooth or Wi-Fi communication link.

5. The system of claim 1, wherein said interfering audio signal and said reference signal are generated by a vehicle sound system, an entertainment system or a media playing device.

6. The system of claim 1, wherein said mobile device is a smart phone, a smart tablet or a personal digital assistant.

7. A non-transitory computer-readable storage medium having instructions stored thereon which when executed by a processor result in the following operations for cancelling an interfering audio signal, said operations comprising:
    capturing an acoustic audio signal on a mobile device, wherein said acoustic audio signal comprises a combination of a delayed version of said interfering audio signal and a desired audio signal, said desired audio signal generated by a user of said mobile device;
    receiving a wireless communication signal, including a reference signal generated based on said interfering audio signal, through a side-channel to said mobile device, said side-channel comprising a wireless communication link between a source of said interfering signal and said mobile device; and
    cancelling said delayed version of said interfering audio signal from said captured acoustic audio signal, said cancellation based on said reference signal.

8. The non-transitory computer-readable storage medium of claim 7, wherein said reference signal comprises a replica of said interfering audio signal.

9. The non-transitory computer-readable storage medium of claim 7, wherein said wireless communication link comprises a short-range wireless communication link, and said instructions when executed further result in the operations of receiving said reference signal through said short-range wireless communication link.

10. The non-transitory computer-readable storage medium of claim 9, wherein said short-range wireless communication link is a Bluetooth or Wi-Fi communication link.

11. The non-transitory computer-readable storage medium of claim 7, wherein said interfering audio signal and said reference signal are generated by a vehicle sound system, an entertainment system or a media playing device.

12. The non-transitory computer-readable storage medium of claim 7, wherein said mobile device is a smart phone, a smart tablet or a personal digital assistant.

13. A mobile communications platform for cancelling an interfering audio signal, said platform comprising:
    a processor;
    input/output circuitry coupled to said processor;
    a memory coupled to said processor;
    a microphone coupled to said input/output circuitry, said microphone to capture an acoustic audio signal, said acoustic audio signal comprising a combination of a delayed version of said interfering audio signal and a desired audio signal, said desired audio signal generated by a user of said platform;
    wireless communication circuitry to receive a wireless communication signal, including a reference signal generated based on said interfering audio signal, through a side-channel comprising a wireless communication link between a source of said interfering signal and said platform; and
    acoustic echo cancellation circuitry to cancel said interfering audio signal from said delayed version of said captured acoustic audio signal, said cancellation based on said reference signal.

14. The platform of claim 13, wherein said reference signal comprises a replica of said interfering audio signal.

15. The platform of claim 13, wherein said wireless communication circuitry is to provide a short-range wireless communication link to receive said reference signal.

16. The platform of claim 15, wherein said short-range wireless communication link is a Bluetooth or Wi-Fi communication link.

17. The platform of claim 13, wherein said mobile device is a smart phone, a smart tablet or a personal digital assistant.

18. The platform of claim 13, further comprising a touch screen display coupled to said input/output circuitry.

19. An audio source device for interference cancellation, said device comprising:
    audio generation circuitry to generate an interfering audio signal;
    delay circuitry to generate a delayed version of said interfering audio signal;
    a speaker to acoustically transmit said delayed version of said interfering audio signal; and
    wireless communication circuitry to transmit a wireless communication signal, including a reference signal generated based on said interfering audio signal, through a side-channel to a mobile communication device for use in acoustic echo cancellation, said side channel comprising a wireless communication link between said audio source device and said mobile communication device.

20. The device of claim 19, wherein said reference signal comprises a replica of said interfering audio signal.

21. The device of claim 19, wherein said wireless communication circuitry is to provide a short-range wireless communication link to receive said reference signal.

22. The device of claim 21, wherein said short-range wireless communication link is a Bluetooth or Wi-Fi communications link.

23. The device of claim 19, wherein said device is a vehicle sound system, an entertainment system or a media playing device.

\* \* \* \* \*